J. G. MALONEY.
POLE ATTACHING MEANS FOR VEHICLES.
APPLICATION FILED FEB. 23, 1909.

940,982.

Patented Nov. 23, 1909.

Witnesses
Theo. Rosemand
J. J. L. Mulhall

Inventor
Jeremiah G. Maloney,

By Joshua R. H. Potts.

Attorney

UNITED STATES PATENT OFFICE.

JEREMIAH G. MALONEY, OF SCRANTON, PENNSYLVANIA.

POLE-ATTACHING MEANS FOR VEHICLES.

940,982. Specification of Letters Patent. Patented Nov. 23, 1909.

Application filed February 23, 1909. Serial No. 479,527.

*To all whom it may concern:*

Be it known that I, JEREMIAH G. MALONEY, a citizen of the United States, residing at Scranton, in the county of Lackawanna and State of Pennsylvania, have invented certain new and useful Improvements in Pole-Attaching Means for Vehicles, of which the following is a specification.

My invention relates to pole attaching means for vehicles, the object of the invention being to provide improved means for supporting the pole, in combination with improved mechanism for mounting the double-tree, which enables the parts to be readily reversed, so as to position the double-tree either above or below the pole.

With these and other objects in view, the invention consists in certain novel features of construction, and combinations, and arrangements of parts as will be more fully hereinafter described and pointed out in the claim.

Figure 1:
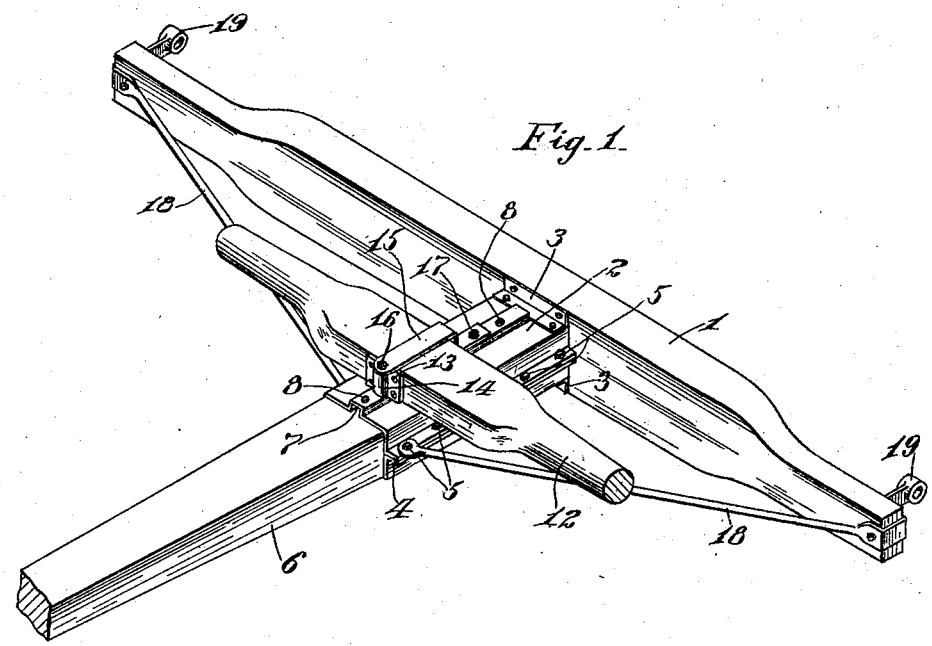
Figure 2:
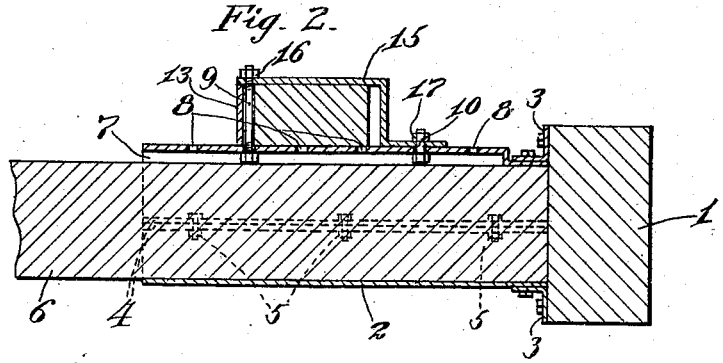
Figure 3:
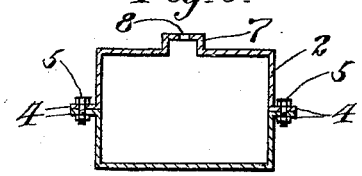

In the accompanying drawings, Figure 1, is a perspective view illustrating my improvements. Fig. 2, is a view in longitudinal section through the pole, and Fig. 3 is a view in cross section through the pole socket.

1 represents a cross bar, to the center of one side of which latter, my improved pole socket 2 is secured by means of angle brackets 3, securely bolted to the bar 1 and to the socket 2.

The socket 2 comprises two half sections having flanges 4 at their adjacent edges to receive bolts 5, and secure the sections together, to securely clamp the sections on the pole 6. One section of the socket is made with a longitudinal offset portion 7, having a series of openings 8 therein, to receive in any of them bolts 9 and 10, as will more fully hereinafter appear.

12 represents a double-tree, to the front face of which a metal plate 13 is secured, and provided with a bearing 14 to receive the bolt 9, which latter is also passed through the forward end of a bar or clevis 15, and the latter at its rear end, is secured to the socket by the bolt 10.

Nuts 16 and 17 respectively, are screwed on to the upper ends of bolts 9 and 10, so as to secure the double-tree in position. The heads of these bolts 9 and 10 lie within the offset portion 7 of the socket, and are held in position against downward movement by the pole 6 within the socket.

The socket is braced by rods or hounds 18 secured at one end on the bolts 5, and at their rear ends secured to the ends of cross bar 1, and said ends are provided with eyes 19 for ordinary thill couplings.

With my improvements, it will be observed that the cross bar 1, socket 2, and the parts carried thereby, can be reversed, so as to position the double-tree below the socket, instead of above, and in a great many instances, this is very desirable, and is one of the features of my improvements. The device is extremely strong to withstand the necessary strains and stresses thereon, and can be manufactured and sold at comparatively small cost.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In a device of the character described, the combination with a reversible cross bar having thill eyes at its ends, a pole socket secured to the center of said cross bar and having a longitudinal offset portion, the latter made with a series of bolt openings, a double-tree, a plate secured to the double-tree and having a bolt receiving bearing or sleeve, a bolt having its head in the offset portion of the socket and projecting through said bearing or sleeve, a bar, a bolt securing the bar at its rear end to said socket, and the forward end of said bar having an opening to receive the first mentioned bolt, and nuts secured on both of said bolts.

In testimony whereof I have signed my name to this specification in the presence of two subscribing witnesses.

JEREMIAH G. MALONEY.

Witnesses:
FRANK E. DONNELLY,
WILLIAM BILLMAN.